Sept. 21, 1971                W. WUNDERLICH                3,606,900
                               SAFETY VALVE
Filed Sept. 22, 1969                                    2 Sheets-Sheet 1
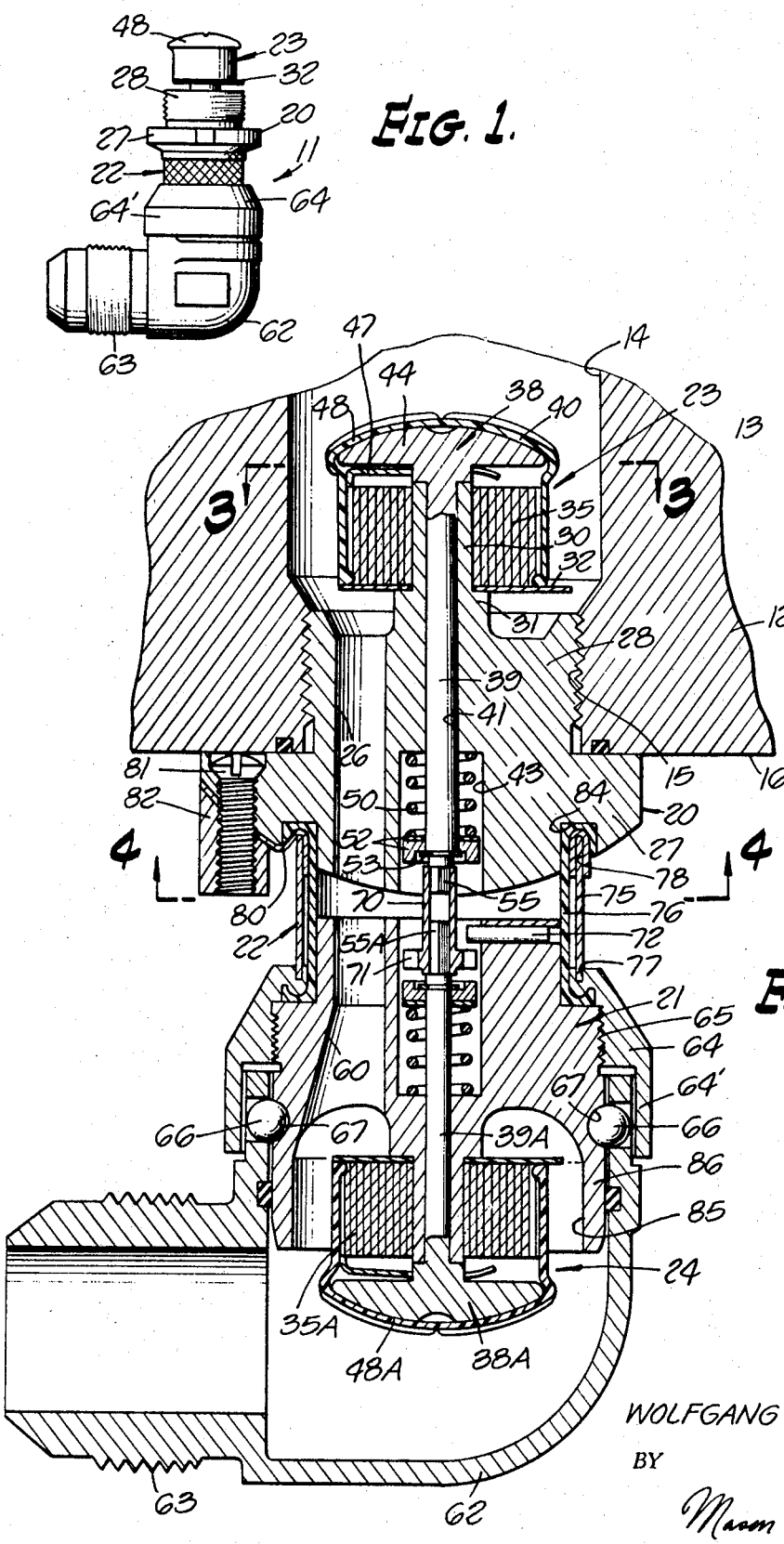
INVENTOR.
WOLFGANG G. WUNDERLICH
BY
Mason & Graham
ATTORNEYS Sept. 21, 1971 W. WUNDERLICH 3,606,900
SAFETY VALVE Filed Sept. 22, 1969 2 Sheets-Sheet 2

INVENTOR.
WOLFGANG G. WUNDERLICH
BY
Mason & Graham
ATTORNEYS

United States Patent Office 3,606,900
Patented Sept. 21, 1971

3,606,900
SAFETY VALVE
Wolfgang Wunderlich, Saugus, Calif., assignor to
The Rucker Company
Filed Sept. 22, 1969, Ser. No. 859,691
Int. Cl. F16k 7/00
U.S. Cl. 137—68
10 Claims

ABSTRACT OF THE DISCLOSURE

The application discloses a dual safety valve for the fuel systems of aircraft or the like in which a pair of wound clock spring actuators encased in boots and located in fuel passages are interconnected by means normally holding the springs wound but subject to releasing the springs and permitting them to unwind and expand their covering boots and thereby close the fluid passages in which they are located when the interconnecting means are subjected to undue external force.

---

The invention has to do generally with safety valves for fuel systems of aircraft and the like designed to close a fuel passage when subjected to undue force, as in the crash of the aircraft.

An object of the invention is to provide a novel, normally open safety valve means adapted to be mounted in and as part of the fuel system of an aircraft or the like for controlling a fuel passage thereof which is releasably held in open position until it or adjacent parts of the system are subjected to an undue external force of greater magnitude than a predetermined value, thereby causing a dislocation or breakage of parts to release the valve means and allow it to close the passage.

A further object is to provide a fitting for a fuel tank or the like which normally provides an unobstructed passage from the interior of the tank to the exterior but which embodies novel, self-closing safety valve means serving to close the passage at or within the tank and also in the fitting exteriorly of the tank in the event the fitting or tank are affected by an abnormal and undue force.

More particularly it is an object to provide a novel, clock spring actuator means adapted to expand an encasing boot to fill a passage space and thereby close the same.

Another object is to provide a dual safety valve embodying novel means for utilizing the torque of wound springs to operate a valve or closure means to closed position and utilizing the torque of one spring to offset or balance the torque of the other in the normal open or set position of the springs. In this connection it is an object to provide such a dual valve in which two valves or closures are so releasably interconnected, that release of one releases the other.

A further object is to provide a safety valve embodying a clock-type spring within a boot and a stem operatively connected to the spring together with novel means limiting travel of the stem longitudinally to prevent damage to the boot.

In summary, it is an object to provide a safety valve of a dual valve type embodying two closure mechanisms, each of which embodies a clock spring actuator encased in an elastic boot located in a fluid passage and normally wound to a contracted position, the spring and boot being adapted to close the fluid passage when the spring is expanded, in conjunction with stem means on each spring and a connection between the two stems normally holding the same against rotation but frangible and displaceable under the influence of undue force to release the stems and the springs.

These and other objects will be apparent from the drawings and the following description. Referring to the drawings:

FIG. 1 is an elevational view of a safety valve embodying the invention;

FIG. 2 is a sectional elevational view of the valve of FIG. 1 shown installed in a tank (partially shown), the plane of the section being on line 2—2 of FIG. 4;

Figure 5:
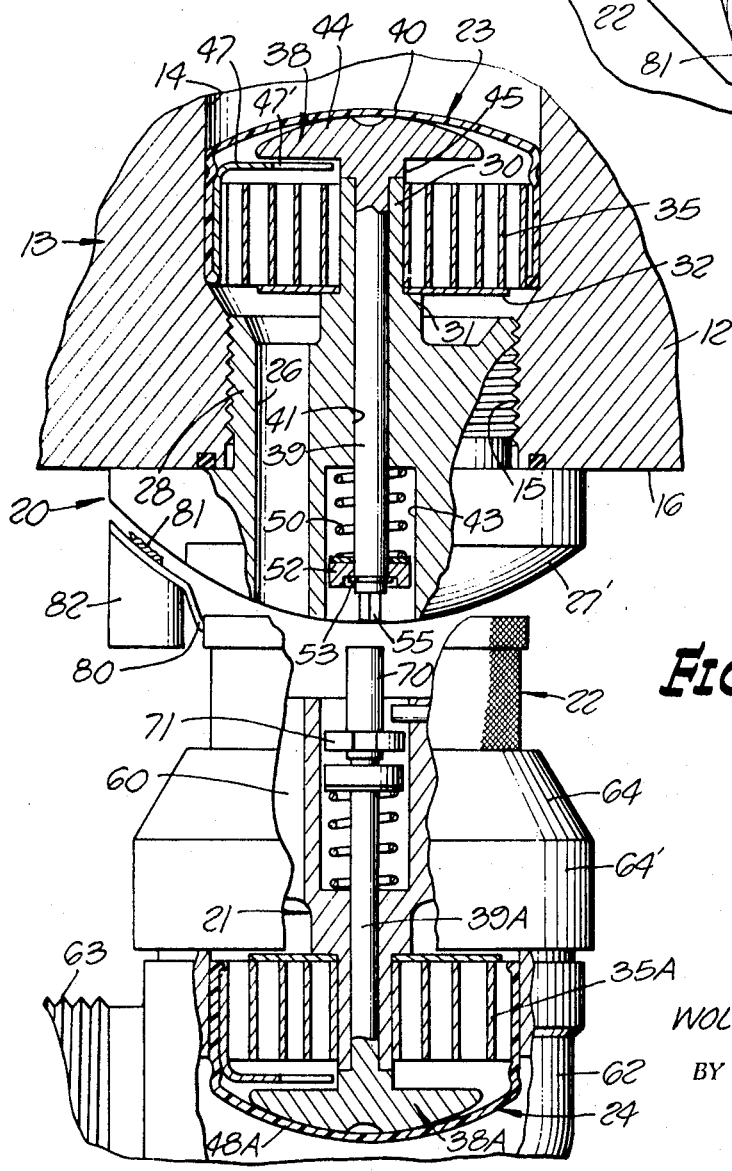
FIG. 5 is a view similar to FIG. 2 but showing the valve in closed position and with the body portions separated.

More particularly describing the invention, a safety valve embodying the invention is designated generally by numeral 11 and is shown in FIGS. 2 and 5 mounted in a wall section 12 of a fuel tank or the like 13 provided with an outlet-inlet passage 14 and a reduced threaded bore 15 between such passage and the exterior surface 16 of the tank. It will be understood that the valve may be connected into any fuel system in the line or to any components thereof and that the fragmentary portion of the fuel tank shown is merely illustrative of one type of installation.

The safety valve 11 in general has two valve bodies, designated 20 and 21 respectively, and these are connected by a weaker tubular section 22. Each body is provided with a valve means or closure means, these being designated generally by numerals 23 and 24 respectively, such means normally being contracted so that there is an annular space or passage around the means permitting fluid to pass thereby. As will later appear, when activated or released, these valves or closures expand, as shown in FIG. 5, to close the passage.

Referring now in more detail to the uppermost valve body 20, this is provided with passages 26 therethrough from end to end for the free flow of fluid. The body is provided with an outer head-like portion 27 and an inner cylindrical portion 28 which is externally threaded to be mounted in the threaded bore 15 of the fuel tank or the like 13. At its inner end the body is provided with a centrally disposed tubular section 30 beyond a central boss 31. Seated against the outer end of the boss is an annular plate 32. A spirally wound actuator spring of laterally flat stock, designated 35, is provided around the tubular section 30 on the plate 32. Any suitable means may be provided for attaching the inner end portion of the spring to the section 30.

Figure 3:
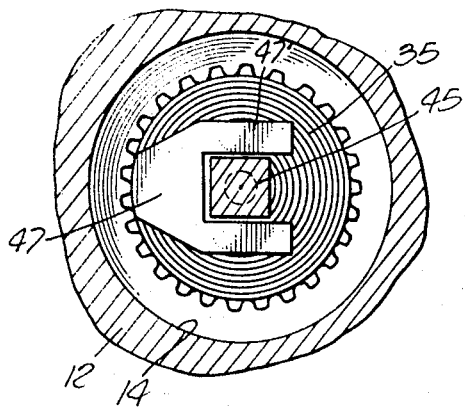
FIG. 3 is a fragmentary sectional view on line 3—3 of FIG. 2.
Figure 4:
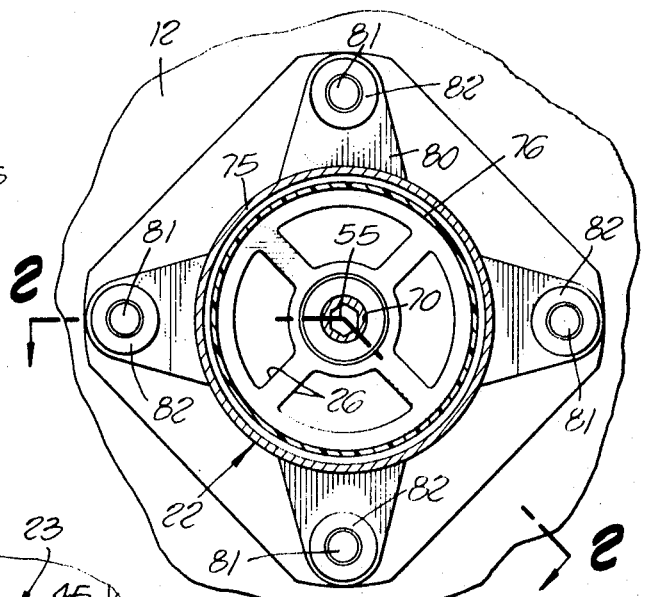
FIG. 4 is a fragmentary sectional view on line 4—4 of FIG. 2.

A stem 38 is mounted centrally of the body and has a shank 39 in a bore 41 that extends from the inner end of the extension 30 to a counterbore 43 at the outer end of the body. This stem is provided with a mushroom-like head 44 having a convexly rounded end. The shank is cylindrical and may be rotated or moved axially relative to the pipe body except for a short noncircular section 45, shown as rectangular. The outer end portion of the spring 35 is engaged with the section 45 of the stem by a clip 47 which is bifurcated at 47' to receive the stem, as shown in FIG. 3.

An elastic boot 48 of rubber, synthetic rubber, plastic or other suitable material fits around the spring and over and around the head of the stem completely encasing the same, the boot preferably being corrugated so that it may be readily expanded. The stem is yieldably held in the position shown by a compression coil spring 50 within the counterbore 43 which bears against washers 52 held by a retaining ring 53. The extreme end portion 55 of the stem shank is also noncircular, being shown as hexagonal in cross section.

The valve body 21, although shaped differently from valve body 20, has the same general structure with respect to the valve or closure means previously described and parts thereof which correspond to those previously described will be given the same numbers but with the suffix A added. Valve body 21 also is provided with fluid passages 60 therethrough from end to end. Since valve body 21 is designed for use in coupling tubing, it is shown provided with an elbow fitting 62 having a threaded end portion 63, the fitting being detachably secured on the body by means of a collar 64 which threads onto the body at 65 and has a skirt 64', serving to retain locking balls 66 in a groove 67 in the body.

In the view, FIG. 2, the two stems 38, 38A are shown connected by a sleeve 70 into which each fits, the interior of the sleeve being formed in cross section to correspond with and receive end portions 55 and 55A of the stems, respectively. Thus, when the springs 35 and 35A are wound, as shown in FIG. 2, the unwind torque force of one is offset or balanced by the torque of the other, the springs being wound in opposite directions. The sleeve 70 preferably is made of a frangible substance, the strength characteristics being such that it will remain intact for the loads and stresses it may be expected to be subjected to in the operation of the aircraft, but will rupture or break under high impact or shear loading as in the crash of an aircraft.

Sleeve 70 has a slotted flange 71 to receive a pin 72 which serves as an assembly aid only. Thus, before the valve bodies are joined, with spring 35A in torqued position, slotted flange 71 will engage with pin 72 and prevent unwinding of spring 35A. Then, when spring 35 is wound in the opposite direction and stem 39 engaged with sleeve 70, the forces of the two springs are balanced or cancelled. During completion of assembly, the upper stem 39 will push sleeve 70 into the position illustrated in FIG. 2, thus disengaging slotted flange 71 from pin 72.

The valve bodies 20 and 21 are connected by a tubular means 22 designed to yield when subjected to abnormally great loads. This includes an expanded metal outer tube 75 and a tube 76 of suitable resilient material. The tube 75 is received in a groove 77 in collar 64 and is mounted in an annular groove 78 formed by a metal bracket 80 that is attached to the body 20 by shear bolts 81 and nuts 82. The body 20 is provided with an annular recess 84 to receive one end of the tube member 76 and the other end is held in place by the collar 64.

It will be apparent that the upper valve or closure means 23 is located within the cylindrical passage or space 14 so that if it were to expand, it would fill the area and close the space against passage of fluid therethrough. In like manner the lower valve means or closure means 24 is located in a bore 85 provided by a tubular extension 86 on the valve body 21 so that when it expands it also closes such fluid passage.

With the parts in normal position the two springs 35 and 35A are wound in opposite directions and their torque balanced or absorbed by the sleeve 70 in which they are received. It will be apparent that if any undue force beyond predetermined limits for which the parts are designed should act upon the device, the two springs would be released and expand, forcing the boots 48, 48A out into engagement with the surrounding walls to completely close the passages against any flow of fluid. This is shown in FIG. 5 where, by way of example, the valve bodies have been shown separated.

There are two basic conditions under which the spring actuators will be released. One condition is that of the application of force vertically against the fitting 62 such as would raise it and valve body 21 relative to valve body 20. This would cause disengagement of the section 45 of stem 38 from clip 47, thereby releasing the upper actuator spring 35. There will then be no torsional resistance to unwinding of the lower actuator spring 35A, which expands. The other condition is the application of force tending to cause a lateral or misalignment of the valve bodies 20 and 21 which may or may not result in shear in a plane normal to and through sleeve 70. Such lateral misalignment will either result in breakage of sleeve 70 or a release of one of the stems therefrom, thereby permitting the springs 35 and 35A to unwind. While a shearing force may deform the outer collar 75, actual breakage will tend to occur through a shearing of the shear bolts 81, as shown in FIG. 5, leaving a dome-shaped non-snag surface 27' on the lower end of the body 20.

I claim:

1. A safety valve for a fuel system or the like, comprising a valve body having a fluid passage therethrough and adapted to be connected to a fuel tank or the like, a spirally wound laterally flat spring mounted at the inner end of said valve body, a stem journaled in the body and extending therethrough from end to end, one end of said spring being connected to said valve body and the other end of said stem, an elastic boot covering said spring, said spring being so constructed and arranged that, when wound, there is a substantial annular space between said elastic boot covering said spring and the fluid passage space in which it is positioned, and when unwound and expanded, said elastic boot fills and thus closes said space, and means normally holding said stem against turning under the unwinding force of the spring, said last-mentioned means being rendered ineffective when subjected to abnormal external force.

2. The safety valve set forth in claim 1 in which said spring is releasably connected to said stem and becomes disengaged from the stem upon axial movement of the stem inwardly of the valve body.

3. The safety valve set forth in claim 1 in which said valve body is provided with a centrally disposed tubular neck at its inner end, in which said spring is disposed around said neck, and in which said stem passes through said neck.

4. A safety valve for a fuel system or the like, comprising a first valve body adapted to be mounted in an outlet passage of a fuel tank or the like, a second valve body positioned outwardly beyond said first valve body, a tubular connection between said valve bodies of less strength than said bodies, said valve bodies each having a fluid passage therethrough from end to end, a normally contracted, radially expansible valve means carried by each valve body at its far end with relation to the other valve body, said valve means each having a torque producing force tending to expand the same, and disengageable means effectively connecting the torque producing means of one valve means to the torque producing valve means of the other, the effective torque force of one torque producing means being opposite to that of the other whereby together they are self-restraining.

5. The safety valve set forth in claim 4 in which said radially expansible valve means each comprises a spirally wound spring encased in an elastic boot.

6. The safety valve set forth in claim 5 in which said disengageable means comprises a stem in each valve body operably connected to an end of the spring and a member connecting said stems and normally preventing rotation of one relative to the other.

7. The safety valve set forth in claim 6 in which said member connecting said stems comprises a sleeve between and receiving the adjacent ends of said stems and interengaging means on said sleeve and on each stem preventing relative rotations between the stems and sleeve.

8. The safety valve set forth in claim 7 in which said sleeve is frangible.

9. A safety valve for a fuel system or the like, comprising a first valve body adapted to be mounted in an outlet passage of a fuel tank or the like, a second valve body positioned outwardly of said first valve body, a tubular connection between said valve bodies of less strength than said bodies, said valve bodies each having a fluid passage therethrough from end to end, a spirally coiled flat spring at the end of said first valve body and a similar spring at the far end of said second valve body, an elastic boot covering each spring responsive to expansion of the spring to expand and close the associated fluid passage, a stem in each body and extending therethrough from end to end and through the spring at the end thereof, sleeve means receiving the adjacent ends of said stems and effective to prevent their relative rotation, said stems being mounted for limited axial movement, and means normally connecting each stem to an end of its associated spring for holding said spring in a contracted condition, said last-mentioned means being disconnectable upon axial movement of the stem to provide for expansion of said spring.

10. The saftey valve set forth in claim 9 in which each stem is yieldably urged to a given position by a coil spring interposed between the stem and the valve body.

References Cited

UNITED STATES PATENTS

| | | | |
|---|---|---|---|
| 2,687,145 | 8/1954 | Carter | 251—61.1X |
| 3,043,542 | 7/1962 | Neuschotz | 137—68X |

FOREIGN PATENTS

| | | | |
|---|---|---|---|
| 1,013,449 | 12/1965 | Great Britain | 137—68 |
| 169,900 | 12/1959 | Sweden | 251—331 |

M. CARY NELSON, Primary Examiner

R. GERARD, Assistant Examiner

U.S. Cl. X.R.

137—614; 251—336